Patented Dec. 20, 1949

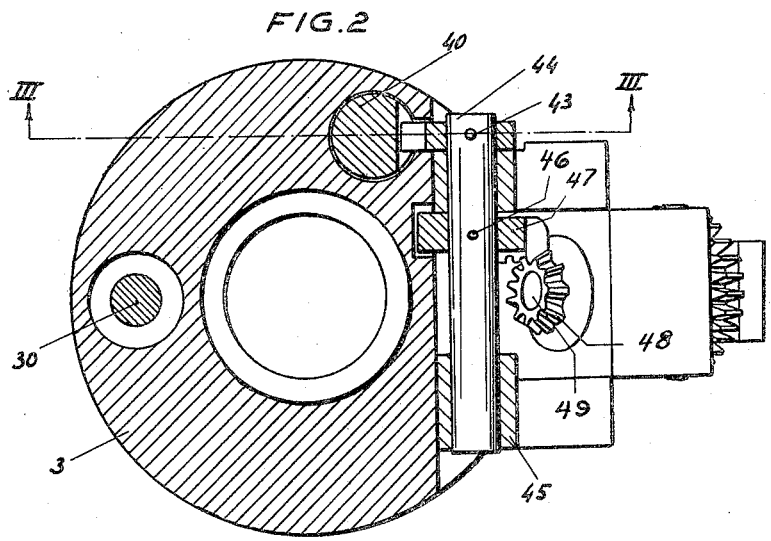
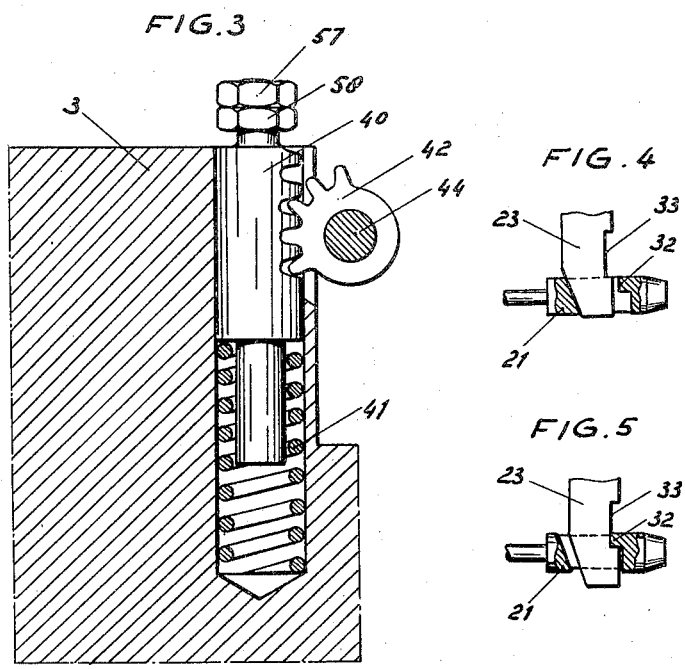

2,491,859

UNITED STATES PATENT OFFICE 2,491,859

TURRET DRILL HEAD

Ernst Hijmans, The Hague, Netherlands, assignor to N. V. Nederlandsche Instrumentenfabriek "Waldorp," The Hague, Netherlands, a company of the Netherlands Application July 12, 1946, Serial No. 683,186
In the Netherlands October 19, 1942

Section 1, Public Law 690, August 8, 1946
Patent expires October 19, 1962

6 Claims. (Cl. 77—25)

This invention relates to a turret drill head of the kind comprising a base part which accommodates the boring spindle and is movable therewith in a direction towards and away from the work but does not rotate therewith, and a turret body arranged on the base part for rotation preferably about an axis inclined to that of the boring spindle but otherwise remaining fixed, and which holds the various tool heads, the latter being provided with coupling members which are complementary to an adjustable coupling member on the boring spindle with which they can be alternately coupled by turning the turret head, and having furthermore means for locking the turret body in the working position with respect to the base part and a control member actuating on the one hand the coupling of the boring spindle and on the other hand the locking means.

In the known turret drill head, the control member is in the form of a rocking lever. When as often occurs, several tools on the turret head are to be used successively on the same workpiece, for example, for drilling and reaming, thread-cutting and countersinking, the control member must be actuated separately each time a tool is withdrawn from the work, which results in interruption of the working cycle, interference in the working rhythm and therefore an undesirable reduction in the possible working speed. Moreover, the said actuation calls for additional attention.

The invention has for its primary object to improve the turret drill head and particularly to increase the speed and reliability of operation thereof.

In a turret drill head according to the invention, the control member is constituted by a thrust rod extending in the axial direction of the base part, the rod being movable in the said axial direction and being under spring action.

This thrust rod is automatically actuated in dependence upon the reciprocating movement to which the turret drill head is subjected in the forward and backward movements of the drill and thus this movement can at the same time be used for the automatic rotation of the turret body with each automatic actuation of the control members.

In itself automatic rotation of the turret body as indicated and in combination with an automatic actuation of the boring spindle coupling is known, but in such arrangement however, there is no controlled, that is, no at least partially compulsorily moved locking device. Furthermore the turret body (the axis of rotation of which lies at an angle of 45° to the axis of the boring spindle) together with the spindle about which it is rotatable, is movable in the axial direction of the boring spindle with respect to the base part of the head.

The invention provides a turret drill head in which there is automatic rotation and locking and with which a high degree of accuracy in machining can be attained in consequence of the rigid seating of the turret body, and in which the turret body may be of large dimensions since it no longer requires to be lifted from the base part, so that the drill head can be also arranged for drills of larger diameter. Therefore a rotating device different from the known kind is necessary. This device may be provided externally of the base part and may have a toothed pinion which engages on a toothed rim provided externally on the turret body.

Two constructional embodiments of the invention are shown by way of example in the accompanying drawings. In said drawings:

Figure 2 is a section on line II—II of Figure 1;

Figure 3 is a section on line III—III of Figure 2;

Figures 4 and 5 are detail views showing the lower end of the thrust rod forming the control member, in two different positions.

Like reference numerals denote like parts in the several figures.

Figure 1:
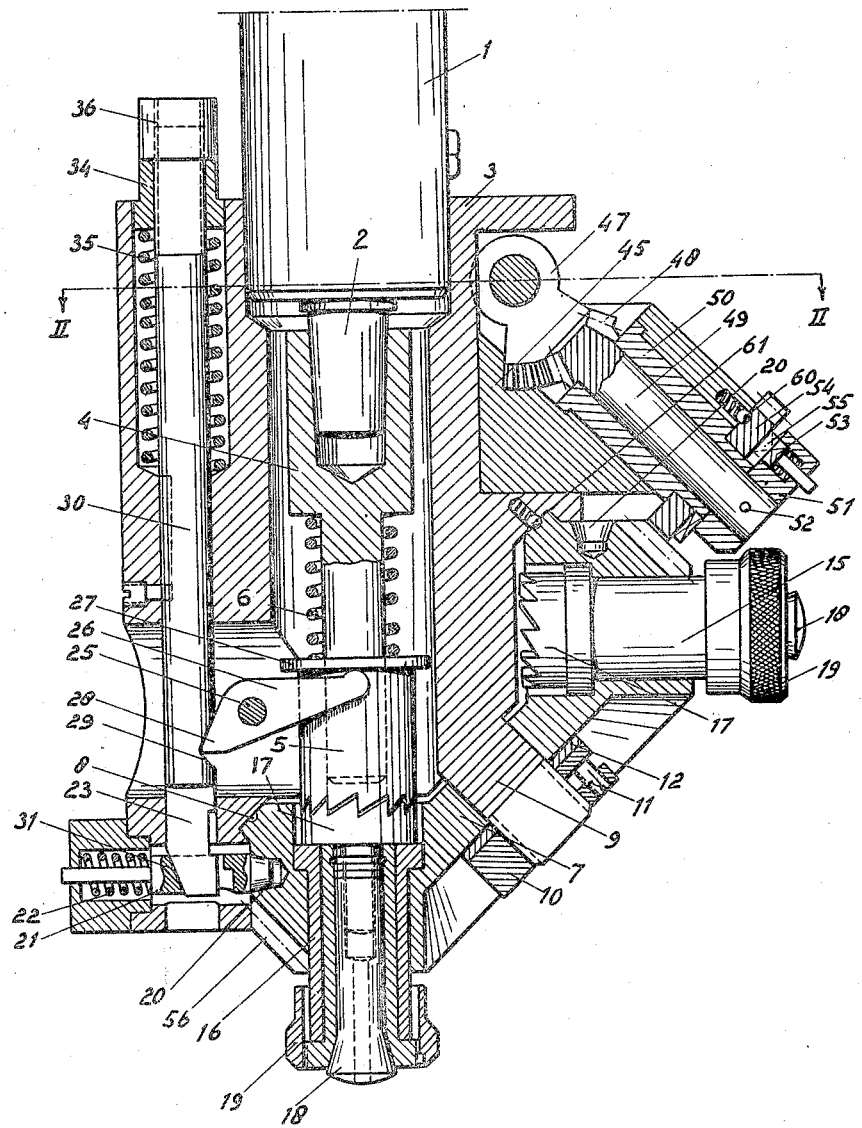
Figure 1 is a sectional view through the boring spindle and the pivot of the turret body of the first embodiment.

Referring firstly to Figure 1, 1 indicates the boring spindle sleeve which is movable up and down but does not rotate, as usually occurs with boring machines, and in which is arranged a rotating tapered boring spindle 2. On the sleeve 1 there is immovably fixed the base part 3 of the turret drill head as, for example, by means of set screws or a clamping device. Within the base part 3 there is an extension 4 of the boring spindle, said extension being firmly secured to the spindle by means of a tapered bore therein. On the end of the extension 4 is fitted one member 5 of a claw or toothed coupling, said member being displaceable axially along the extension 4 and being subjected to the action of a spring 6 which bears against a shoulder on the extension and urges the member 5 away from the spindle 2.

The turret body 7 is rotatably mounted on the base part 3, being guided by an annular recess 8 in said body which co-operates with an annular bead on the base part 3 concentric with a fixed pivot 9. The turret body 7 is held by means of a nut 10 on the pivot 9, said nut being provided with a safety locking device 11, an underlying plate 12 being inserted between the turret body and the nut.

A plurality of tool heads 15, for example six, are carried on the turret body 7. These tool heads run in bushes 16 and complementary coupling members 17 are provided for the coupling member 5 of the boring spindle. The heads are fitted in the usual way with flexible chucks 18 into which the cylindrical shanks of drills, reamers, and the like, can be inserted and clamped by the rotation of the heads 19.

The turret body 8 is provided with a number of notches 20 corresponding to the number of the tool heads 15. The base part has a catch 21 which is under urge of a spring 22 so as, on the rotation of the turret body 7, to snap into one or other of the different notches 20. When the catch 21 engages in one of the notches 20, the corresponding tool head is exactly in the working position with the teeth of the coupling member 5 in mesh with the teeth of the coupling member 17 of said tool head so that the latter can be set in rotation.

In order that the turret body 7 can be rotated, it is first necessary for the driving coupling member 5 to be moved against the action of the spring 6 to disengage said member from the driven coupling member 17. This movement of the coupling member 5 is effected by means of a fork 26 which is rotatable about a pivot 25 and which bears against a collar 27 on said coupling member 5. The fork has a cam portion 28 which co-operates with a notch 29 in an axially movable thrust rod 30. When the rod 30 is moved axially downwardly the coupling member 5 is raised and the coupling disengaged. At the same time the flat lower end 23 of the rod 30 passes through a slot in the catch 21. This lower end 23 is bevelled to co-operate with an inclined surface 31 of the catch 21. During the downward movement of the rod 30, therefore, the catch 21 is withdrawn from the corresponding notch 20 (to the left in Figure 1), so that the turret body 7 can now be freely rotated.

The thrust rod 30 carries at its upper end an abutment 34 in the form of a threaded nut against which engages one end of a compression spring 35, the other end of the spring seating in the base part 3. The spring 35 thus tends continuously to move the thrust rod 30 upwardly whereby the coupling 5, 17 is engaged. A screw which engages in a slot 14 in the thrust rod 30, limits the movement of said rod.

Figures 4 and 5 show in detail the co-operation of the rod 30 with the catch 21. As the catch 21 is moved to the left, a nose 32 thereon engages in a recess 33 in the rod 30. When pressure on the rod is released, upward movement of said rod can only take place if the catch 21 moves from the position shown in Figure 5 towards the right, in other words, when it is opposite a notch 20 in the turret body 7. If this is not the case, then the catch 21 abuts against the turret body and consequently remains stationary, and the rod 30 is held in the position shown in Figure 5 against the nose 32 of the catch 21. Under these conditions the coupling member 5 is prevented from returning to its lowermost or operative position and faulty or incomplete coupling of the boring spindle with one of the tool heads 15 is consequently impossible.

When a boring operation has been completed, the drill is withdrawn from the work by raising the drill head with the boring spindle 1, as in Figure 1. The thrust rod 30 is now so positioned that during this movement it abuts against a fixed stop on the frame of the drilling machine and is forced downwardly with the result that the turret body 7 can then be turned directly into a different working position. The thrust rod 30 is provided with a head 36 adapted to abut the said stop and which can be adjustably fixed thereon so that the time at which the rod is actuated can be regulated.

A second thrust rod 40 (see Figure 2) is also arranged in the base part 3 and this also extends in the axial direction of the turret. This rod 40 is under the influence of a compression spring 41 (Figure 3) which forces it upwardly. The thrust rod 40 is formed with rack teeth which co-operate with a toothed segment 42 pinned at 43 on a cross shaft 44 rotatably carried in a bridge piece 45 fixed on the base part 3. Also pinned as at 46 to the shaft 44 is a bevel spur wheel segment 47 (Figures 1 and 2) which co-operates with a bevel spur-wheel 48 on an inclined spindle 49 journalled in a bush 50 which is also carried by the bridge piece 45. The shaft 49 is provided at one end with a locking pawl device which is firmly fitted thereon by means of a pin 52 and includes a spring catch 53. A spur-wheel 54 also rotates on the bush 50 and is provided on one face thereof with locking teeth 55 which engage the catch 53. The locking pawl device together with the spur-wheel 54 constitutes a "free wheel" coupling. This spur-wheel 54 furthermore has teeth on its circumference engaging a toothed rim 56 provided externally on the turret body 7.

This stepwise-rotation mechanism for the turret body 7 is so constructed that a small downward movement of the thrust rod 40 produces rotation of the turret body 7 from one tool head to the following one. It has been found possible so to select the gear transmission that an axial feed of 13 mm. of the thrust rod 40 is sufficient to produce this movement. The thrust rod 40 is furthermore provided with an adjustable head here shown as comprising a nut 57 and a lock nut 58. This head engages a fixed abutment on the frame of the drilling machine when the drill is withdrawn from the work, the arrangement being such that first the head 36 of the thrust rod 30 abuts the corresponding stop to disconnect the coupling 5, 17 and withdraw the catch 21 from the respective notch 20 and free the turret body, and only then does the head 57, 58 engage the other abutment on the frame to produce the rotational step of the turret body.

The spur wheel 54 is provided with only two teeth 55, and thus works in coarse stages. Care is taken that the movement which the locking device 51 carries out during each adjustment of the turret body (withdrawing it from the work) is somewhat more than 180°. The wheel 54, however, is assured each time of exactly 180° rotation, due to the fact that there are only two teeth 55. The number of the circumferential teeth on the wheel 54 and on the toothed rim 55 are so chosen that they ensure exactly the rotation of the turret body over one step with rotation of 180° of the wheel 54. If the boring spindle sleeve 1 then again moves downwardly and the thrust rods 30 and 40 again move outwardly the locking device 51 thus again rotates back into the previous position, the turret body 7 being again fixed by the catch 21 and the coupling 5, 17 again being engaged so that working can again directly take place with the tool now in the working position.

A spring-pressed ball 60 also co-operates with the spur wheel 54. Therefore the pinion 54 is provided in its face with two diametrically opposed notches in which the ball 60 is adapted to fit, so that the wheel 54 may be locked in two positions spaced 180° from one another. In this way the exactly correct position of the wheel 54 is assured in each working position. In the same way, the exact position of the turret body 7 is assured by means of a spring-pressed ball 61.

Figure 6:
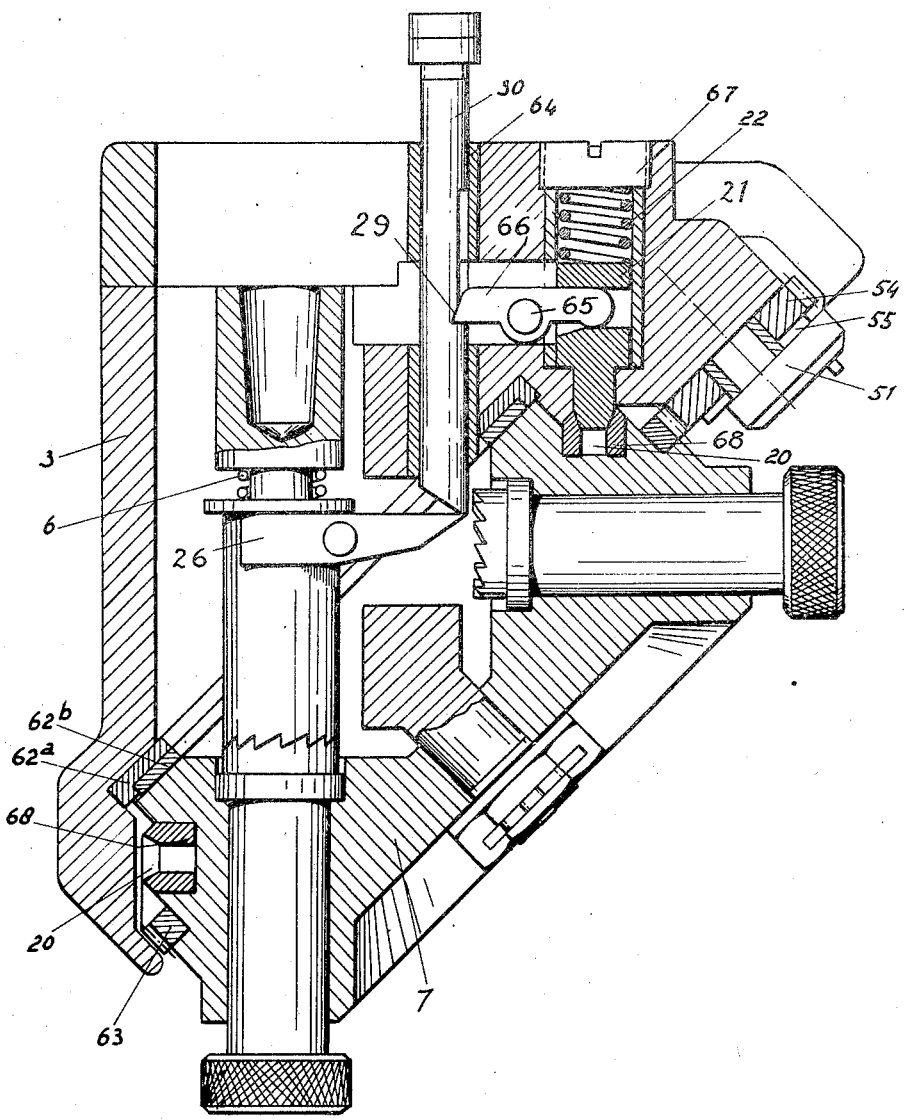
Figure 6 is a sectional view, similar to Figure 1, of the second embodiment of the invention.

The embodiment of the invention shown in Figure 6 differs from that according to Figures 1 to 5 in that here the thrust rod 30, which again actuates the boring spindle, the coupling 5, 17 and the locking device 21 for the turret body 7, are arranged at the opposite side of the spindle, whereby the position of this rod is still less restrictive and the coupling between the rod and the locking device can be given a more suitable form. The general arrangement of the turret drill head remains, however, the same, particularly as regards the turret feed or advance mechanism. Here, however, the base part 3 is formed as a single casting with the bridge piece (indicated at 45 in Figure 1) for the rotation mechanism. If this casting is made, for example, of silumin, the whole turret drill head is very light, so that it can be of large dimensions while being suitable for hand manipulation.

The base part 3 is here shown as provided with a separate runner ring 62a for the turret body 7, whilst the latter is provided with a separate runner ring 62b co-operating with the ring 62a and also with a separate toothed ring 63.

The thrust rod 30 is guided by a sleeve 64 and its lower end bears against the fork 26 again in the form of a rocking lever. In consequence of this construction, a separate spring (such as 35 in Figure 1) can be dispensed with, since the coupling spring 6 serves to force the thrust rod 30 outwardly.

A lever 66 rockable about a shaft 65 engages in the notch 29 in the rod 30. The other end of the lever engages in the catch 21 which is here arranged parallel to the rod 30 and engages the base part 3 at a position diametrically opposite that of the catch 21 in Figure 1. The tension of the spring 22 is adjustable by means of a threaded plug 67. It will be seen that in this case also the boring spindle coupling 5, 17 is always first disengaged, and then the catch 21 is withdrawn from the notch 20, so that the coupling cannot re-engage before the catch 21 has again entered a notch 20.

The notches 20 are formed in separate insets 68. The fixed pivot 9 of the base part 3 on which the turret body 7 rotates is cast with said base part.

What I claim is:

1. A drilling machine comprising in combination a driving spindle, a tool head movable to and from a stationary part of the machine and enclosing the driving spindle, a turret body carrying tool holders and mounted for rotation on the said head about an axis of rotation located at an angle to the axis of the spindle, a coupling member on the spindle, coupling members carried by the tool holders complementary for the coupling member on the spindle, the coupling member adapted to be engaged alternatively with the coupling members upon rotation of the turret member, a latch device for latching the turret body to the head under the control of an actuating member, which at the same time controls the engagement of the coupling members, the said actuating member consisting of a push rod mounted in said head and extending and movable axially of the spindle to abut against the stationary part of the machine, a spring urging said rod to a position to effect engagement of the latch and coupling members, means for stepwisely rotating the turret body, and a second axially movable push rod serving as a driving member of the device capable of stepwisely rotating the turret body.

2. A drilling machine comprising in combination a driving spindle, a tool head movable to and from a stationary part of the machine and enclosing the driving spindle, a turret body carrying tool holders and mounted for rotation on the said head about an axis of rotation located at an angle to the axis of the spindle, a coupling member on the spindle, coupling members carried by the tool holders complementary for the coupling member on the spindle, the coupling member adapted to be engaged alternatively with the coupling members upon rotation of the turret member, a latch device for latching the turret body to the head under the control of an actuating member, which at the same time controls the engagement of the coupling members, the said actuating member consisting of a push rod mounted in said head and extending and movable axially of the spindle to abut against the stationary part of the machine, a spring urging said rod to a position to effect engagement of the latch and coupling members, means for stepwisely rotating the turret body including an externally toothed rim on the turret body and a gear meshing with said rim, and a second axially movable push rod serving as a driving member for rotating said gear.

3. A drilling machine comprising in combination a driving spindle, a tool head movable to and from a stationary part of the machine and enclosing the driving spindle, a turret body carrying tool holders and mounted for rotation on the said head about an axis of rotation located at an angle to the axis of the spindle, a coupling member on the spindle, coupling members carried by the tool holders complementary for the coupling member on the spindle, the coupling member adapted to be engaged alternatively with the coupling members upon rotation of the turret member, a latch device for latching the turret body to the head under the control of an actuating member, which at the same time controls the engagement of the coupling members, the said actuating member consisting of a push rod mounted in said head and extending and movable axially of the spindle to abut against the stationary part of the machine, a spring urging said rod to a position to effect engagement of the latch and coupling members, means for stepwisely rotating the turret body including an externally toothed rim on the turret body, a gear meshing with said rim, a second axially movable push rod serving as a driving member for rotating said gear, and transmission means including a unidirectional coupling interposed between said last-mentioned push rod and said gear.

4. A drilling machine comprising in combination a driving spindle, a tool head movable to and from a stationary part of the machine and enclosing the driving spindle, a turret body carrying tool holders and mounted for rotation on the said head about an axis of rotation located at an angle to the axis of the spindle, a coupling member on the spindle, coupling members carried by the tool holders complementary for the coupling member on the spindle, the coupling member adapted to be engaged alternatively with the coupling members upon rotation of the turret member, a latch device for latching the turret body to the head under the control of an actuating member, which at the same time controls the engagement of the coupling members, the said actuating member consisting of a push rod mounted in said head and extending and movable axially of the spindle to abut against the stationary part of the machine, a spring urging said rod to a position to effect engagement of the latch and coupling members, means for stepwisely rotating the turret body including an externally toothed rim on the turret body, a gear meshing with said rim, a second axially movable push rod serving as a driving member for rotating said gear, and transmission means including a unidirectional coupling interposed between said last-mentioned push rod and said gear, said unidirectional coupling including mechanism operable in coarse stages to carry out a small but uniform driving movement, the magnitude of which exactly corresponds to the rotation of the turret body from one working position to a following position with the stroke of the second push rod changing between substantially wide limits.

5. A drilling machine comprising in combination a driving spindle, a tool head movable to and from a stationary part of the machine and enclosing the driving spindle, a turret body carrying tool holders and mounted for rotation on the said head about an axis of rotation located at an angle to the axis of the spindle, a coupling member on the spindle, coupling members carried by the tool holders complementary for the coupling member on the spindle, the coupling member adapted to be engaged alternatively with the coupling members upon rotation of the turret member, a latch device for latching the turret body to the head under the control of an actuating member, which at the same time controls the engagement of the coupling members, the said actuating member consisting of a push rod mounted in said head and extending and movable axially of the spindle to abut against the stationary part of the machine, a spring urging said rod to a position to effect engagement of the latch and coupling members, means for stepwisely rotating the turret body including an externally toothed rim on the turret body, a shaft mounted on said head, a gear loosely carried on said shaft, a bevel gear fixedly carried by said shaft, a second bevel gear meshing with the bevel gear on said shaft, a second axially movable push rod having rack teeth formed thereon, a pinion meshing with said rack teeth, means coupling said rack meshing pinion with the second bevel gear whereby movement of said rack will impart movement to said shaft, and a unidirectional coupling interposed between said shaft and the gear loosely carried thereon for transmitting reciprocating motion of the second push rod into rotation of the turret body.

6. A drilling machine comprising in combination a driving spindle, a tool head movable to and from a stationary part of the machine and enclosing the driving spindle, a turret body carrying tool holders and mounted for rotation on the said head about an axis of rotation located at an angle to the axis of the spindle, a coupling member on the spindle, coupling members carried by the tool holders complementary for the coupling member on the spindle, the coupling member adapted to be engaged alternatively with the coupling members upon rotation of the turret member, a latch device for latching the turret body to the head under the control of an actuating member, which at the same time controls the engagement of the coupling members, the said actuating member consisting of a push rod mounted in said head and extending and movable axially of the spindle to abut against the stationary part of the machine, a spring urging said rod to a position to effect engagement of the latch and coupling members, means for stepwisely rotating the turret body including an externally toothed rim on the turret body, a shaft mounted on said head, a gear loosely carried on said shaft, a bevel gear fixedly carried by said shaft, a second bevel gear meshing with the bevel gear on said shaft, a second axially movable push rod having rack teeth formed thereon, a pinion meshing with said rack teeth, means coupling said rack meshing pinion with the second bevel gear whereby movement of said rack will impart movement to said shaft, and a unidirectional coupling interposed between said shaft and the gear loosely carried thereon for transmitting reciprocating motion of the second push rod into rotation of the turret body, said unidirectional coupling including mechanism operable in coarse stages to carry out a small but uniform driving movement, the magnitude of which exactly corresponds to the rotation of the turret body from one working position to a following position with the stroke of the second push rod changing between substantially wide limits.

ERNST HIJMANS.

REFERENCES CITED

The following references are of record in the file of this patent:

UNITED STATES PATENTS

| Number | Name | Date |
|---|---|---|
| 983,395 | Ogle | Feb. 7, 1911 |
| 1,924,383 | Stampfli | Aug. 29, 1933 |